United States Patent
Ryu (10) Patent No.: US 9,777,947 B2
(45) Date of Patent: Oct. 3, 2017

(54) METHOD FOR CONTROLLING CASCADE BOILER SYSTEM

(71) Applicant: KYUNGDONG ONE CORPORATION, Seoul (KR)

(72) Inventor: Sung Hoon Ryu, Seoul (KR)

(73) Assignee: KYUNGDONG ONE CORPORATION, Seoul (KR)

( * ) Notice: Subject to any disclaimer, the term of this patent is extended or adjusted under 35 U.S.C. 154(b) by 29 days.

(21) Appl. No.: 14/892,466

(22) PCT Filed: May 21, 2014

(86) PCT No.: PCT/KR2014/004543
§ 371 (c)(1),
(2) Date: Nov. 19, 2015

(87) PCT Pub. No.: WO2014/189288
PCT Pub. Date: Nov. 27, 2014

(65) Prior Publication Data
US 2016/0116185 A1 Apr. 28, 2016

(30) Foreign Application Priority Data
May 24, 2013 (KR) ........................ 10-2013-0059018

(51) Int. Cl.
*F22B 33/12* (2006.01)
*F22B 33/18* (2006.01)
(Continued)

(52) U.S. Cl.
CPC ......... *F24H 9/2007* (2013.01); *F24D 3/1091* (2013.01); *F24D 19/1006* (2013.01); *G05D 23/1919* (2013.01); *F24D 2200/043* (2013.01)

(58) Field of Classification Search
CPC .......... F22B 33/00; F22B 33/12; F22B 33/18; F24D 2200/043
(Continued)

(56) References Cited

U.S. PATENT DOCUMENTS

| 2,780,206 A | * | 2/1957 | La Rocque | ............. F22B 31/04 122/448.3 |
| 7,509,927 B2 | * | 3/2009 | Mukomilow | ......... F24D 3/1066 122/235.15 |

(Continued)

FOREIGN PATENT DOCUMENTS

| DE | 201 09 236 U1 | 10/2001 | |
| DE | CA 2549262 A1 | * 6/2007 | ........... F24D 3/1066 |

(Continued)

OTHER PUBLICATIONS

International Search Report dated Aug. 18, 2014, issued to International Application No. PCT/KR2014/004543.
(Continued)

*Primary Examiner* — Gregory A Wilson
(74) *Attorney, Agent, or Firm* — Stein IP, LLC (57) ABSTRACT

Provided is a method for controlling a cascade boiler system, and the method includes a) operating the number of boilers set in an initial operation state, b) detecting a supply water temperature and a returned water temperature of the primary side of the hydro-separator and a supply water temperature and a returned water temperature of the secondary side, and calculating a flow rate corrected by the hydro-separator using the detected temperatures, c) calculating a set temperature serving as the supply water temperature of the primary side that is able to maintain the supply water temperature of the secondary side when the supply water temperature of the secondary side is within a set range of a target temperature while maintaining the initial operation state, and d) calculating the number of boilers that are able to maintain the calculated set temperature, and controlling an operation of the boilers according to the number.

7 Claims, 5 Drawing Sheets

(51) Int. Cl.
*F24H 9/20* (2006.01)
*F24D 3/10* (2006.01)
*F24D 19/10* (2006.01)
*G05D 23/19* (2006.01)

(58) Field of Classification Search
USPC .................................................... 122/448.3
See application file for complete search history.

(56) References Cited

U.S. PATENT DOCUMENTS

| | | | | |
|---|---|---|---|---|
| 7,806,346 | B2* | 10/2010 | Mukomilow | F24D 3/1066 |
| | | | | 122/235.15 |
| 9,568,187 | B2* | 2/2017 | Miura | F22B 33/00 |
| 2013/0199753 | A1* | 8/2013 | Muren | F28D 19/00 |
| | | | | 165/80.1 |
| 2014/0083706 | A1* | 3/2014 | Scott | F22B 37/26 |
| | | | | 166/305.1 |

FOREIGN PATENT DOCUMENTS

| | | |
|---|---|---|
| EP | 0 445 310 A1 | 9/1991 |
| EP | 2 187 136 A2 | 5/2010 |
| JP | H 8-75254 A | 3/1996 |
| JP | 2005-98628 A | 4/2005 |
| KR | 10-1138055 B1 | 4/2012 |
| KR | 10-1172215 B1 | 8/2012 |
| KR | 10-1234528 B1 | 2/2013 |

OTHER PUBLICATIONS

European Office Action dated Feb. 23, 2017, issued by the European Patent Office in corresponding application EP 14800380.9.
Canadian Office Action dated Sep. 26, 2016, issued by the Canadian Patent Office in corresponding application CA 2,913,109.
Chinese Office Action dated May 22, 2017, issued by the Chinese Patent Office in corresponding application CN 201480029998.6.

* cited by examiner

METHOD FOR CONTROLLING CASCADE BOILER SYSTEM

CROSS-REFERENCE TO RELATED APPLICATIONS

This application is a national stage of International Application No. PCT/KR2014/004543, filed May 21, 2014, which claims the benefit of priority to Korean Application No. 10-2013-0059018, filed May 24, 2013, in the Korean Intellectual Property Office, the disclosures of which are incorporated herein by reference.

TECHNICAL FIELD

The present invention relates to a method for controlling a cascade boiler system, and more particularly, to a method for controlling a cascade boiler system capable of controlling accurate heating using a temperature sensor regardless of a difference in flow rate between a boiler side and a load side.

BACKGROUND ART

In general, a cascade boiler system has a capacity of a middle or large size boiler by connecting a plurality of boilers in parallel. While a control method thereof is more difficult than the case in which a middle- or large-sized boiler is used, the heating can be controlled according to circumstances, and a heating capacity can be increased according to necessity.

The cascade boiler system generally uses a configuration in which a hydro-separator is provided between a boiler side to which a plurality of boilers are connected in parallel and a load side serving as an indoor pipeline section. This is to prevent occurrence of a phenomenon of lack of a supply flow rate of hot water in which a flow rate of the boiler side is lower than a necessary flow rate of the load side when only some of the plurality of boilers are operated according to circumstances.

The hydro-separator functions to mix returned water returned to the boiler side from the load side with hot water to supplement the supply flow rate of the hot water when the flow rate of the hot water supplied from the boiler side to the load side is low.

Figure 1:
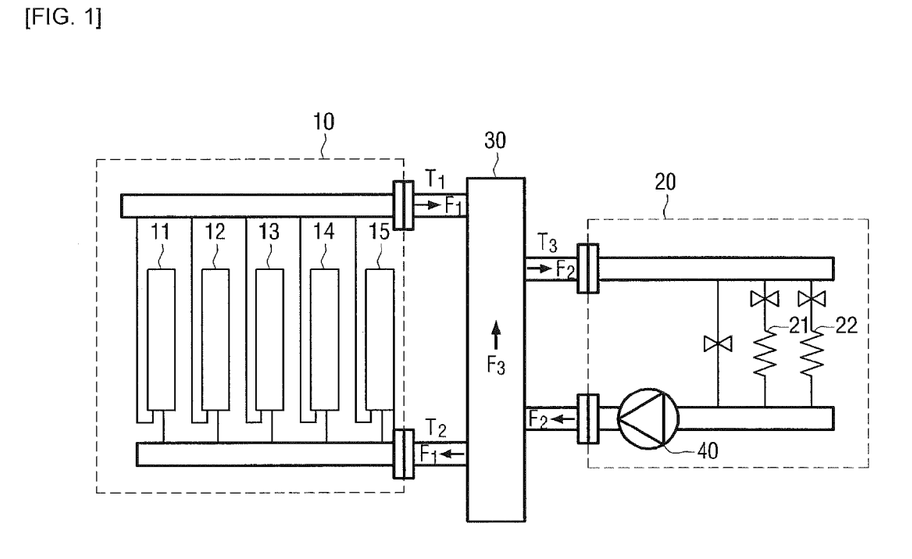
FIG. 1 is a systemic configuration view for describing a method for controlling a cascade boiler system of the related art.
Figure 2:
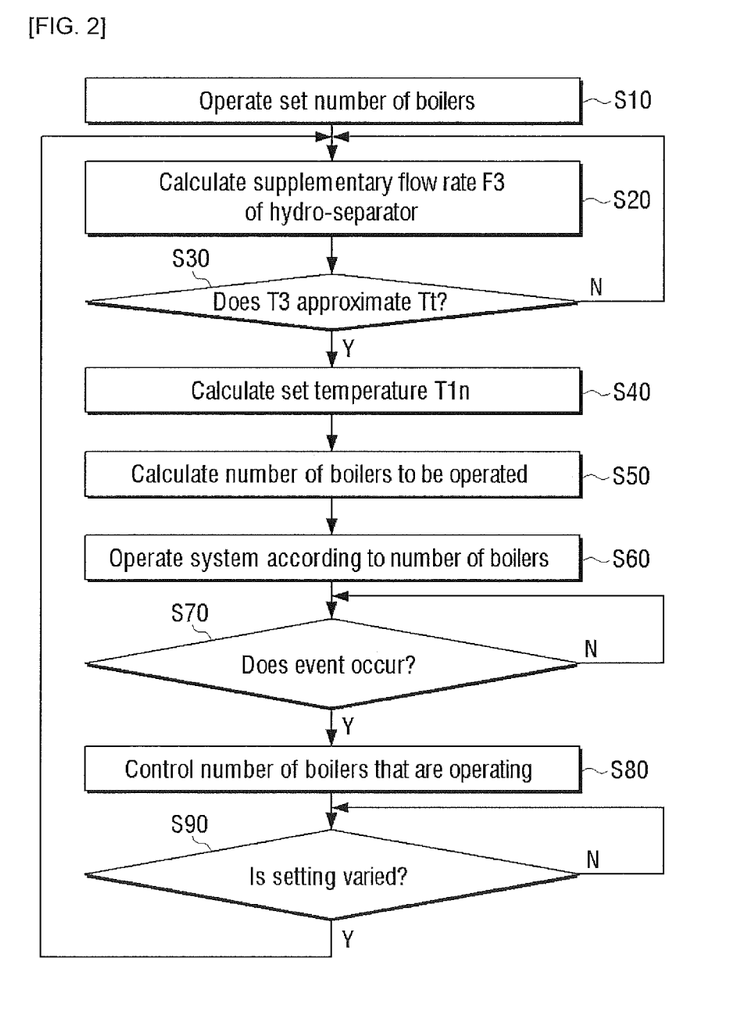
FIG. 2 is a control flowchart of a cascade boiler system according to an exemplary embodiment of the present invention.
Figure 3:
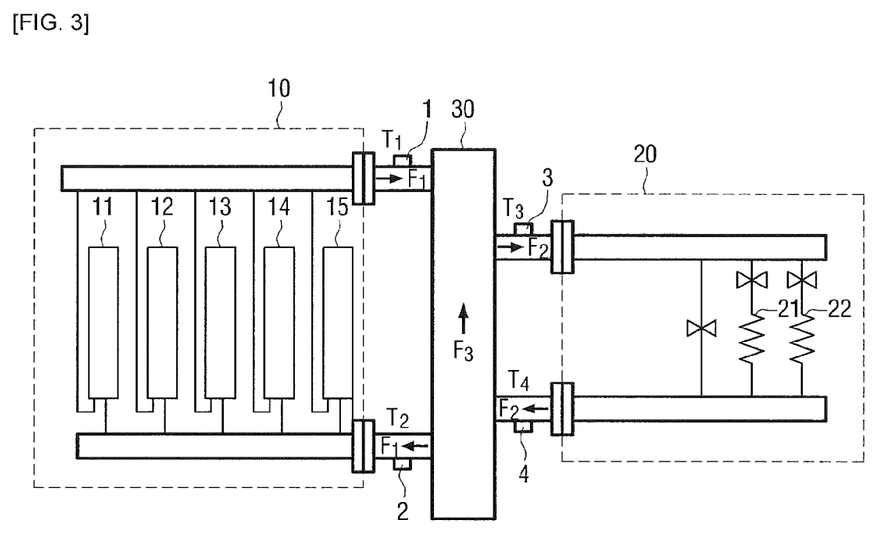
FIGS. 3 to 5 are views showing a relation between a flow rate and a temperature for describing a control condition of the present invention.

A configuration and an action of the hydro-separator are disclosed in detail in Korean Patent No. 10-1172215 (entitled "Cascade system, method for controlling the same, and heating-dedicated boiler constituting the same," registered on Aug. 1, 2012, see FIGS. 1 to 3). A control method when the hydro-separator of the related art is used and problems of the control method will be described as follows.

FIG. 1 is a systemic configuration view for describing a method for controlling a cascade boiler system of the related art.

Referring to FIG. 1, the cascade boiler system includes a primary side 10 to which a plurality of boilers 11, 12, 13, 14 and 15 are connected in parallel, a secondary side 20 having loads 21 and 22, and a hydro-separator 30 configured to connect the primary side 10 and the secondary side 20 and correct a supply flow rate.

In such a configuration, a heating temperature is set with reference to a supply water temperature T3 of the secondary side, three boilers 13, 14 and 15 of the primary side 10 are operated, and a sum of flow rates of pumps provided at the boilers 13, 14 and 15 becomes a flow rate F1 of the primary side 10.

Here, while a normal operation of the system may be performed if the flow rate F1 of the primary side 10 is equal to a flow rate F2 of the secondary side 20, when the flow rate F1 of the primary side 10 is smaller than the flow rate F2 of the secondary side 20, a supplementary flow rate F3 of the hydro-separator 30 that is a portion of a flow rate of water returned from the secondary side 20 to the primary side 10 is added to the supply flow rate F1 of the primary side 10 to become the flow rate F2 of the secondary side 20 in the hydro-separator 30.

Here, since the flow rate F2 of the secondary side 20 is added by the supply water heated by the boilers 13, 14 and 15 of the primary side 10 and the supplementary flow rate F3 of the returned water having a temperature decreased by passing the loads 21 and 22 of the secondary side 20, the supply water temperature T3 of the secondary side 20 is lower than a target temperature Tt.

In this state, if it is normal, the boilers 11 and 12 that are not in operation should be operated, and a process of determining a supply flow rate again as described above is repeated in a state in which the boiler 12 is operated, thereby determining whether the supply water temperature T3 of the secondary side 20 is equal to a target temperature Tt. While the above-mentioned determination procedure is repeated to adjust the supply water temperature T3 of the secondary side 20 to be controlled to maximally approximate the target temperature Tt, the procedure is time-consuming to cause a consumer's dissatisfaction and decrease the consumer's trust with respect to the boiler system.

In addition, since the primary side 10 has a large temperature difference between a returned water temperature T2 and the supply water temperature T1, the supply water temperature T3 of the secondary side 20 cannot be easily controlled in a state in which the boiler 12 is operated, i.e., the temperature T3 may be higher than the target temperature Tt.

In order to solve the problems, while a method of increasing a circulation flow rate of the boilers 11 to 15 by adding a pump to the outside may be used, production cost and maintenance cost of the cascade boiler system are increased.

In addition, since the flow rates are detected at the respective positions to control the boiler in the related art, a flowmeter 40 is needed to increase the cost of the cascade boiler system.

SUMMARY OF INVENTION

Technical Problem

In consideration of the above-mentioned problems, the present invention is directed to provide a method for controlling a cascade boiler system capable of matching a temperature of heating supply water to a set temperature for a short time without using a flowmeter or an external pump.

In addition, the present invention is also directed to provide a method for controlling a cascade boiler system capable of calculating a flow rate required for control and reducing cost using a temperature sensor, without using a relatively expensive flowmeter.

Solution to Problem

In order to solve the problems, the present invention provides a method for controlling a cascade boiler system including a primary side including a plurality of boilers, a secondary side including a load, and a hydro-separator disposed between the primary side and the secondary side to correct a flow rate, the method including: a) operating the number of boilers set in an initial operation state; b) detecting a supply water temperature and a returned water temperature of the primary side of the hydro-separator and a supply water temperature and a returned water temperature of the secondary side, and calculating a flow rate corrected by the hydro-separator using the detected temperatures; c) calculating a set temperature serving as the supply water temperature of the primary side that is able to maintain the supply water temperature of the secondary side when the supply water temperature of the secondary side is within a set range of a target temperature while maintaining the initial operation state; and d) calculating the number of boilers that are able to maintain the calculated set temperature, and controlling an operation of the boilers according to the number.

Advantageous Effects of Invention

According to the method for controlling the cascade boiler system of the present invention, all of the boilers included in the system can be operated to rapidly reach a target temperature at the beginning of the operation, and thus, a consumer's satisfaction can be increased.

In addition, as the temperatures of the inlet port and the outlet port of the hydro-separator are detected and the flow rate is calculated using the detected temperatures, the cost can be reduced in comparison with the system of the related art using the flowmeter.

In addition, as the number of boilers that are in operation to maintain the set temperature is calculated to control the operation of the boiler, the number of operating boilers can be set to a level required for an optimal operation.

-Reference Signs List-

| | |
|---|---|
| 1: first temperature sensor | 2: second temperature sensor |
| 3: third temperature sensor | 4: fourth temperature sensor |
| 10: primary side | 11, 12, 13, 14, 15: boiler |
| 20: secondary side | 21, 22: load |
| 30: hydro-separator | |

DESCRIPTION OF EMBODIMENTS

Hereinafter, a method for controlling a cascade boiler system of the present invention will be described with reference to the accompanying drawings.

Figure 4:
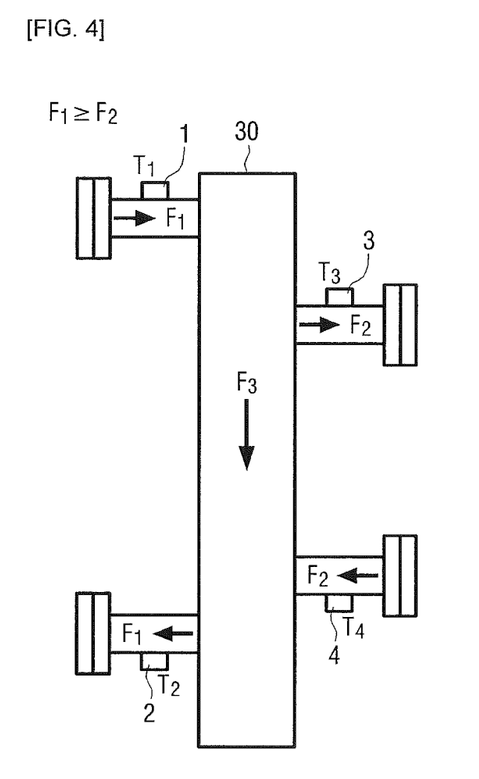
Figure 5:
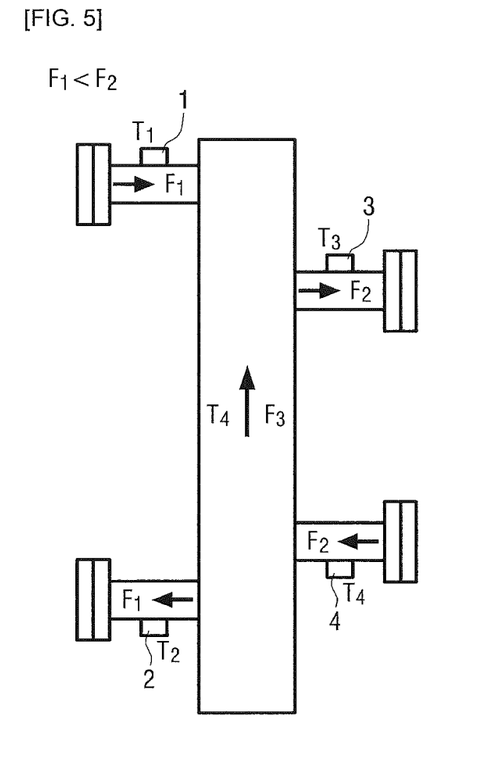

FIG. 2 is a flowchart showing a method for controlling a cascade boiler system according to an exemplary embodiment of the present invention, and FIGS. 3 to 5 are views showing a relation between a flow rate and a temperature for describing a control condition of the present invention.

Referring to FIGS. 2 to 5, the method for controlling the cascade boiler system according to the exemplary embodiment of the present invention includes operating the number of boilers that are set for an initial operation among a plurality of boilers 11 to 15 to a set temperature (S10), calculating a flow rate F3 of a hydro-separator 30 that is a difference between a flow rate F2 of a secondary side 20 and a flow rate F1 of a primary side using temperatures detected by first to fourth temperature sensors 1, 2, 3 and 4 configured to detect temperatures of an inlet port and an outlet port of the hydro-separator 30 (S20), determining whether a supply water temperature T3 of the secondary side 20 approximates a target temperature Tt and returning to S10 when the supply water temperature T3 of the secondary side 20 does not approximate the target temperature Tt (S30), calculating a set temperature T1$n$ of the primary side 10 that is a new supply water temperature capable of maintaining the supply water temperature T3 of the secondary side 20 when the supply water temperature T3 of the secondary side approximates the target temperature Tt as a result of the determination of S30 (S40), calculating the number of boilers to maintain the set temperature T1$n$ that is the calculated supply water temperature of the primary side 10 (S50), operating the number of boilers corresponding to the number of boilers calculated in S50 (S60), determining whether an event of varying an operation condition occurs (S70), varying the operation condition of the boiler according to a condition of the event when the event occurs (S80), and returning to S20 when an operation setting is varied by a consumer as a result of confirmation (S90).

Hereinafter, a specific configuration and action of the method for controlling the cascade boiler system according to the exemplary embodiment of the present invention having the above-mentioned configuration will be described.

First, S10 relates to an initial operation state, and the number of boilers set to initially operate among the plurality of boilers 11 to 15 are operated at a set temperature.

Since consumers want to heat a space to a target temperature for a short time as soon as possible, each of the boilers 11 to 15 provided at the primary side 10 of the entire cascade boiler system may be operated to a highest temperature in S10. Such an initial operation state may be varied according to field situations or a consumer's requirements.

Next, in S20, the supplementary flow rate F3 of the hydro-separator 30 is calculated using temperatures T1, T2, T3 and T4 detected by the first to fourth temperature sensors 1, 2, 3 and 4.

Here, calculation of the supplementary flow rate F3 of the hydro-separator 30 enables determination of directionality of the supplementary flow rate F3 of the hydro-separator 30 and the flow rate F1 of the primary side 10 and the flow rate F2 of secondary side 20 through comparison of a supply water temperature T1 of the primary side 10 detected by the first temperature sensor 1 and the supply water temperature T3 of the secondary side 20 detected by the third temperature sensor 3.

Referring to FIG. 4, it will be appreciated that the case in which the supply water temperature T1 of the primary side 10 detected by the first temperature sensor 1 is equal to the supply water temperature T3 of the secondary side 20 detected by the third temperature sensor 3 is the case in which the flow rate F1 of the primary side 10 is equal to the flow rate F2 of the secondary side 20 or the flow rate F1 of the primary side 10 is larger than the flow rate F2 of the secondary side 20, and at this time, the flow rate F1 of the primary side 10 is represented as a sum of the flow rate F2 of the secondary side 20 and the flow rate F3 of the hydro-separator 30.

As shown in FIG. 4, the following Equation 1 can calculate the flow rate F3 of the hydro-separator 30 when the flow rate F1 of the primary side 10 is larger than the flow rate F2 of the secondary side 20. However, when the flow rate F1 of the primary side 10 is large as described above, there is no control problem because the supply water temperature T1 of the primary side 10 is equal to the supply water temperature T3 of the secondary side 20.

$$F3=(F2\times(T2-T4))\div(T1-T2) \qquad \text{<Equation 1>}$$

Referring to FIG. 5, on the contrary to the case of FIG. 4, it will be appreciated that the flow rate F2 of the secondary side 20 is larger than the flow rate F1 of the primary side 10 when the supply water temperature T1 of the primary side 10 detected by the first temperature sensor 1 is larger than the supply water temperature T3 of the secondary side 20 detected by the third temperature sensor 3.

This is because the flow rate F3 having a returned water temperature T4 of the secondary side 20 detected by the fourth temperature sensor 4 is added to the flow rate F1 having the supply water temperature T1 of the primary side 10 to become the supply water temperature T3 and the flow rate F2 of the secondary side 20. The returned water temperature T4 of the secondary side 20 is a temperature lower than the supply water temperatures T1 and T3, and the returned water of the secondary side 20 is introduced into the hydro-separator 30 and then added to the flow rate F1 of the supply water of the primary side 10 to form the supply water temperature T3 of the secondary side 20 having a lower temperature.

In the case of FIG. 5, the flow rate F3 of the hydro-separator 30 can be calculated from the following Equation 2.

$$F3=(F1\times(T1-T3))\div(T3-T4) \qquad \text{<Equation 2>}$$

From Equation 2, it will be appreciated that the flow rate F3 of the hydro-separator 30 is a value obtained by dividing a difference between the supply water temperature T1 of the primary side 10 and the supply water temperature T3 of the secondary side 20 by a difference between the supply water temperature T3 of the secondary side 20 and the returned water temperature T4, and multiplying the divided result and the flow rate F1 of the primary side. Here, since the flow rate F1 of the primary side is equal to a sum of pump capacities of the boiler 11 to 15 that are currently operating, the flow rate F3 of the hydro-separator 30 can be calculated.

As described above, while there is no difficulty in control of the cascade boiler system when the flow rate of the primary side 10 is greater as shown in FIG. 4, when the flow rate F1 of the primary side 10 is smaller than the flow rate F2 of the secondary side 20 as shown in FIG. 5, a difference between the supply water temperature T1 of the primary side 10 and the supply water temperature T3 of the secondary side 20 occurs to cause difficulty in control.

The flow rate F3 of the hydro-separator 30 is periodically calculated, and in the following description, the flow rate F3 that is lately calculated is applied.

Next, in S30, it is determined whether the supply water temperature T3 of the secondary side 20 approximates the target temperature Tt. Here, the approximation is provided according to setting of the system, and may be set according to necessity such as a range of a difference between the supply water temperature T3 and the target temperature Tt, for example, ±1° C. Of course, the approximation includes the case in which the supply water temperature T3 of the secondary side is equal to the target temperature Tt. Here, the target temperature Tt is a heating temperature set by a consumer.

When the temperature is not within the range, the operation state of S10 is maintained, and when it is determined that the temperature approximates the range, it means that the number of operating boilers 11 to 15 should be adjusted such that the supply water temperature T3 of the secondary side 20 is maintained at the target temperature Tt by adjusting the temperature to the set temperature T1n that is a new supply water temperature, other than the current supply water temperature T1 of the primary side 10.

Next, in S40, the set temperature T1n set as the new supply water temperature T1 of the primary side 10 is calculated.

Here, the set temperature T1n can be calculated by the following Equation 3 using the lately calculated flow rate F3 of the hydro-separator 30.

$$T1n=T3+((F3\div F1)\times(T3-T4)) \qquad \text{<Equation 3>}$$

The set temperature T1n is a new supply water temperature of the primary side 10, and the flow rate F2 of the secondary side 20 is determined by adding the flow rate F3 of the hydro-separator 30 to the flow rate F1 of the primary side 10. Here, the temperature of the supply water increased by the hydro-separator 30 is equal to the returned water temperature T4 of the secondary side 20. Accordingly, the set temperature T1n can be calculated by multiplying a ratio of the flow rate F3 of the hydro-separator 30 with respect to the flow rate F1 of the primary side 10 and a difference between the supply water temperature T3 of the secondary side 20 and the returned water temperature T4, and adding the multiplied result and the supply water temperature T3 of the secondary side 20.

Next, in S50, the number of boilers 11 to 15 to be operated is calculated according to the calculated set temperature T1n. The number of boilers to be operated can be calculated by substituting the flow rate of each of the boilers and the number (N) of boilers configured to supply the flow rate with the flow rate F1 of the primary side 10 of Equation 3.

That is, the flow rate F1 of the primary side of Equation 3 is a value obtained by multiplying the flow rate of one boiler and the number (N) of boilers to be operated. The flow rate of the one boiler is constant, and the number (N) of boilers to be operated can be calculated using Equation 3.

Next, S60, operations of the boilers 11 to 15 are controlled according to the calculated number (N) of boilers. When the number (N) of boilers to be operated is 3, the operation of the boilers 11 and 12 is stopped, and the operation state of the boiler 13, 14 and 15 is maintained.

Next, in S70, it is determined whether an event related to a variation of the operation condition occurs during S60. Here, in the event to be considered, even when the boilers 13, 14 and 15 that are currently operating are maximally operated, the temperature may be less than the set temperature T1n (an event A), or even when the boilers 13, 14 and 15 are minimally operated, the temperature may exceed the set temperature T1n (an event B).

In the case of the event A, the boiler 12 should be additionally operated to solve the problem, and in the case of the event B, the operation of the boiler 13 should be stopped. However, such an event is one-time event, and a variation of the operation state is not preferable when the event is maintained for a short time. In addition, when the event A and the event B are continued for a time set by the set number or more, the operation state of the boiler may be varied.

Accordingly, the variation of the operation state due to a temporary cause such as an error upon detection of the temperature can be prevented to enable a more stable operation.

Next, in S80, the control of increasing or decreasing the number of boilers that are operating is performed according to the generated event.

Next, in S90, it is determined whether a consumer varies the setting such as a variation of the target temperature Tt, and S20 is performed again when the setting is varied and the current state is maintained when the setting is not varied.

As described above, the operation of the cascade boiler system of the present invention can be controlled by calculating the flow rate using the temperature of the hot water or the returned water introduced into or discharged from the hydro-separator 30 without using an expensive flowmeter.

In addition, the number of boilers that are initially operated can be determined due to a feed forward type control, and then, a method of correcting an error using a feedback method can be used to enable rapid control.

The foregoing description concerns an exemplary embodiment of the invention, is intended to be illustrative, and should not be construed as limiting the invention. The present teachings can be readily applied to other types of devices and apparatuses. Many alternatives, modifications, and variations within the scope and spirit of the present invention will be apparent to those skilled in the art.

INDUSTRIAL APPLICABILITY

Since all of the boilers included in the system can be operated to more rapidly reach the target temperature at the initial operation, satisfaction of consumers can be increased.

The invention claimed is:

1. A method for controlling a cascade boiler system comprising a primary side including a plurality of boilers, a secondary side including a load, and a hydro-separator disposed between the primary side and the secondary side to correct a flow rate, the method comprising:
  a) operating the number of boilers set in an initial operation state;
  b) detecting a supply water temperature and a returned water temperature of the primary side of the hydro-separator and a supply water temperature and a returned water temperature of the secondary side, and calculating a flow rate corrected by the hydro-separator using the detected temperatures;
  c) calculating a set temperature serving as the supply water temperature of the primary side that is able to maintain the supply water temperature of the secondary side when the supply water temperature of the secondary side is within a set range of a target temperature while maintaining the initial operation state; and
  d) calculating the number of boilers that are able to maintain the calculated set temperature, and controlling an operation of the boilers according to the number.

2. The method for controlling the cascade boiler system according to claim 1, wherein, after d), whether an event of varying an operation condition occurs is determined, and when the event occurs, the number of boilers that are operating is adjusted according to a type of the event.

3. The method for controlling the cascade boiler system according to claim 1, wherein, in a), all of the plurality of boilers are operated to reduce a time that the supply water temperature of the secondary side reaches the target temperature.

4. The method for controlling the cascade boiler system according to claim 1, wherein a supplementary flow rate of the hydro-separator calculated in b) is calculated by the following Equation 2, $$F3=(F1\times(T1-T3))\div(T3-T4) \quad \text{Equation 2}$$

wherein F3 is a supplementary flow rate of the hydro-separator, T1 is a supply water temperature of the primary side, T3 is a supply water temperature of the secondary side, T4 is a returned water temperature of the secondary side, and F1 is a flow rate of the primary side that is a sum of pump capacities of the boilers.

5. The method for controlling the cascade boiler system according to claim 1, wherein the set temperature calculated in c) is calculated by the following Equation 3, $$T1n=T3+((F3\div F1)\times(T3-T4)) \quad \text{Equation 3}$$

wherein $T1n$ is a set temperature, T3 is a supply water temperature of the secondary side, F1 is a flow rate of the primary side, F3 is a supplementary flow rate of the hydro-separator, and T4 is a returned water temperature of the secondary side that is equal to a supplementary water temperature of the hydro-separator.

6. The method for controlling the cascade boiler system according to claim 5, wherein, in d), the number of boilers operated to maintain the set temperature serving as the supply water temperature of the primary side is calculated by substituting a value obtained by multiplying a flow rate of one boiler that is constant and the number of boilers that are operating with the flow rate F1 of Equation 3.

7. The method for controlling the cascade boiler system according to claim 2, wherein, in the event, a sum of maximum capacities of the boilers that are currently operating is smaller than the set temperature, or
  a sum of minimum capacities of the boilers that are currently operating is larger than the set temperature.

* * * * *